(12) United States Patent
Gaulmin et al.

(10) Patent No.: US 9,346,553 B2
(45) Date of Patent: May 24, 2016

(54) BALANCING THE POWER OF TWO TURBOSHAFT ENGINES OF AN AIRCRAFT

(75) Inventors: François-Xavier Gaulmin, Salon de Provence (FR); Lionel Iraudo, Marseilles (FR); Daniel Chaniot, Marignane (FR)

(73) Assignee: Airbus Helicopters, Marignane (FR)

( * ) Notice: Subject to any disclaimer, the term of this patent is extended or adjusted under 35 U.S.C. 154(b) by 1309 days.

(21) Appl. No.: 11/764,825

(22) Filed: Jun. 19, 2007

(65) Prior Publication Data

US 2008/0275597 A1   Nov. 6, 2008

(30) Foreign Application Priority Data

Jun. 19, 2006   (FR) ...................... 06 05477

(51) Int. Cl.
| | | |
|---|---|---|
| *F23N 5/18* | (2006.01) | |
| *G05B 13/02* | (2006.01) | |
| *B64D 31/12* | (2006.01) | |
| *F02C 9/28* | (2006.01) | |
| *F02C 9/42* | (2006.01) | |

(52) U.S. Cl.
CPC . *B64D 31/12* (2013.01); *F02C 9/28* (2013.01); *F02C 9/42* (2013.01)

(58) Field of Classification Search
CPC .......... B64D 31/00; B64D 31/12; F02C 9/28; F02C 9/42; F02C 9/44; F05D 2270/052; F05D 2270/053

USPC .......... 701/1, 3, 14, 100, 101, 104; 60/39.15, 60/39.21, 39.43, 340, 420, 484, 490, 700, 60/719–720, 793–793
See application file for complete search history.

(56) References Cited

U.S. PATENT DOCUMENTS

| | | | | |
|---|---|---|---|---|
| 4,644,744 | A * | 2/1987 | Mittendorf et al. | 60/39.15 |
| 4,817,046 | A * | 3/1989 | Rice et al. | 701/100 |
| 5,315,819 | A * | 5/1994 | Page et al. | 60/39.282 |
| 5,622,045 | A * | 4/1997 | Weimer et al. | 60/204 |
| 5,915,273 | A * | 6/1999 | Germanetti | 73/178 H |
| 2006/0064959 | A1 * | 3/2006 | Simoni | 60/39.281 |

FOREIGN PATENT DOCUMENTS

| | | |
|---|---|---|
| DE | 4125372 | 8/1992 |
| EP | 0199038 | 10/1986 |
| EP | 0816226 | 1/1998 |
| FR | 2749545 | 12/1997 |
| GB | 2095755 | 10/1982 |

* cited by examiner

*Primary Examiner* — Thomas G Black
*Assistant Examiner* — Ce Li
(74) *Attorney, Agent, or Firm* — Brooks Kushman P.C.

(57) ABSTRACT

The present invention relates to a method and to an associated fuel metering system for balancing the power delivered by two aircraft turboshaft engines by determining first and second limiting margins of the engines (M1, M2) which are transformed into first and second power margins. Thereafter, the values of the first and second power margins are compared in order to determine a primary difference between said first and second power margins. Finally, the engine having the greater power margin is accelerated in order to balance the first and second engines in power by minimizing the primary difference to as great as extent as possible.

10 Claims, 1 Drawing Sheet

BALANCING THE POWER OF TWO TURBOSHAFT ENGINES OF AN AIRCRAFT

The present invention relates to a method and a system enabling the power from two turboshaft engines on an aircraft to be balanced. In particular, on a twin-engined rotorcraft, it is important to balance the power from the two engines so that both of them are subjected to similar amounts of damage, e.g. for the purpose of limiting maintenance actions, and so that the performance of the aircraft is optimized.

BACKGROUND OF THE INVENTION

Twin-engined rotorcrafts are generally provided with two free-turbine turboshaft engines. Power is then taken from a low pressure stage of each free turbine that rotates at about 20,000 revolutions per minute (rpm) to about 50,000 rpm. Thereafter, a gearbox is necessary to connect the free turbines to the main rotor that provides lift and propulsion since the speed of rotation of the rotor lies substantially in the range 200 rpm to 400 rpm: this is the main gearbox (MGB). It is also desirable to balance power from the engines so that each engine delivers identical power to the MGB.

Thermal limitations on engines and torque limitations on the MGB enable three normal operating ratings to be defined for use with turboshaft engines:
- a takeoff rating that can be used for five to ten minutes, corresponding to a level of torque for the gearbox and to a level of heating for each engine that can be accepted for a limited length of time without significant damage: this is the maximum takeoff power (PMD);
- a maximum continuous rating such that the capacities of the main gearbox and those that result from the maximum heating that is acceptable on a continuous basis upstream of the high pressure blades of the first stage of each free turbine are not exceeded at any time: this is the maximum continuous power (PMC); and
- a maximum transient rating, set by regulation: this is known as the maximum transient power (PMT).

There also exist super contingency ratings when one of the two engines fails:
- a super contingency rating during which the capabilities of the main gearbox on the inlet stages and the thermal capabilities of the turboshaft engine are used to the maximum: this is referred to as super-emergency power (PSU), it can be used during 30 seconds consecutively at the most, and three times during a flight. Using the PSU requires the engine to be removed and overhauled;
- a super contingency rating during which the capabilities of the main gearbox on its inlet stages and the capabilities of the turboshaft engine are used very fully: this is referred to as maximum emergency power (PMU) that can be used for 2 minutes following PSU, or for a maximum of 2 minutes and 30 seconds consecutively; and
- a super contingency rating during which the capabilities of the main gearbox on the inlet stages and the thermal capabilities of the turboshaft engine are used without damage: this IS referred to as intermediate emergency power (PIU) and can be used for 30 minutes or continuously for the remainder of the flight after the engine has failed.

The engine manufacturer uses calculation and testing to draw up available power curves for a turboshaft engine as a function of altitude and outside temperature, and does so for each of the above-defined ratings.

In addition, the manufacturer determines the limitations of the turboshaft engine that make it possible to obtain a minimum power for each of the above-specified ratings and an acceptable lifetime, the minimum power corresponding in particular to the power developed by a turboshaft engine that is old, i.e. an engine that has reached its maximum lifetime. These limits are generally monitored by means of three surveillance parameters of the engine: the speed of rotation of the engine's gas generator; the engine torque; and the ejection temperature of the gas at the inlet to the free turbine of the engine, which parameters are respectively known as Ng, Cm, and T45 to the person skilled in the art.

To monitor these limits, document FR 2 749 545 discloses a piloting indicator that identifies amongst the surveillance parameters of the turboshaft engine, which parameter is the parameter closest to its limit. The information relating to which limitations are to be complied with is thus grouped together on a single display, thereby making it possible firstly to obtain a summary and present only the result of the summary so as to simplify the task of the pilot, and secondly to save space on the instrument panel. This produces a "limiting parameter" amongst said surveillance parameters of the engine, i.e. the parameter whose current value is the closest to the corresponding limit value. That is why such an indicator is also referred to below as a first limitation indicator or "IPL".

Furthermore, variants of such an IPL serve to display the value of the limiting parameter as an equivalent power, i.e. in terms of a power margin such as +10% of PMD, for example, or else as a pitch margin, where pitch indicates the position of the rotor blades of the rotorcraft relative to the incident air flow.

Furthermore, whatever the rating, turboshaft engines are piloted by using a piloting parameter selected by the manufacturer from the above-mentioned surveillance parameters, representative of the operation of the engine both during a stage of stabilized use and during a transient phase.

A relationship for limiting the piloting parameter as a function of altitude and of outside pressure can then be defined so as to ensure that none of the surveillance parameters exceeds its limit in most configurations, e.g. when flying in hot weather.

In this context, balancing the engines of a twin-engined rotorcraft is generally performed by aligning the values of the piloting parameter for both engines. Consequently, if the piloting parameter is the speed of rotation Ng, for example, then balancing is achieved when both engines have the same speed of rotation Ng. That does not constitute a genuine balance, but rather a mere alignment. Aligning the piloting parameters of the engines does not guarantee that their powers will be in balance, since the engines might be operating in significantly different manners.

It should be observed that the engines of the latest generation are controlled by controlling electronic computers known as full-authority digital engine control (FADEC) by the person skilled in the art, serving to determine the position of a fuel metering unit as a function firstly of a regulation loop including a primary loop based on maintaining the speed of rotation of the rotorcraft rotor, and secondly on a secondary loop based on a setpoint value for the piloting parameter. Such FADECs then implement the principle of balancing, or rather aligning, as mentioned above, by determining setpoint values for the piloting parameter of each engine that are very close to each other.

Balancing on those lines is effective but reveals limitations.

Firstly, the engines are continuously balanced on the basis of the value of the same surveillance parameter, namely the piloting parameter. Unfortunately, experience shows that depending on flying conditions, the surveillance parameter that is the most pertinent for achieving balance differs.

Secondly, that principle does not enable engine performance to be optimized. For example, it can happen that maximum power is not reached on the two engines when piloting as a function of torque limitation.

Finally, that principle for balancing appears to be inappropriate if the piloting parameter is the temperature T45 at which gas is ejected or is torque Cm. The relationship associating torque and temperature varies as an engine ages, so it becomes difficult to balance two engines if they do not present the same degree of aging.

OBJECTS AND SUMMARY OF THE INVENTION

An object of the present invention is to propose an automatic method and a system enabling two turboshaft engines of an aircraft to be balanced in power so that the engines deliver substantially identical maximum power regardless of flying conditions or the piloting parameter.

According to the invention, a method of balancing the power delivered by first and second aircraft turboshaft engines, each engine having a plurality of surveillance parameters, is remarkable in that the following steps are performed in succession:

a) determining in real time an individual margin for each surveillance parameter of each engine, said individual margin of a surveillance parameter reflecting the margin available for said surveillance parameter;

b) determining a first limiting margin for the first engine, said first limiting margin being equal to the individual margin of said surveillance parameter of the first engine that is the closest to its limit, and determining a second limiting margin for the second engine, said second limiting margin being equal to the individual margin of said surveillance parameter of the second engine that is the closest to its limit;

c) transforming the first and second limiting margins into first and second power margins, reducing the first and second limiting margins to a scale comparable to the power developed by said engines;

d) comparing the values of the first and second power margins and then determining a primary difference between the first and second power margins; and e) accelerating the engine having the greater power margin in order to bring the first and second engines into power balance, minimizing the primary difference between the first and second power margins to as great an extent as possible, and optionally decelerating the engine having the smaller power margin.

Consequently, during steps a) and b), the initial effect is to determine the limiting margin on each engine, where this margin can be evaluated in an overall manner that is known from elsewhere.

For example, the individual margin of each surveillance parameter is equal to the individual difference in real time between a current value minus a limit value for the surveillance parameter as set by the manufacturer. Furthermore, the limit value of a surveillance parameter can be established by taking account in real time of the outside pressure and the outside temperature, as explained in document FR 2 749 545.

It should be observed that if the surveillance parameter is the torque of the engine, then the individual margin may reflect the margin available for that surveillance parameter compared with a limit value defined by the manufacturer. Nevertheless, if the aircraft is a rotorcraft, then the individual margin may reflect the margin that is available for engine torque so that torque limits of the main gearbox of the rotorcraft are not exceeded.

It is also possible to envisage variants in which the limiting margin of an engine is mainly determined, for example, as a function of values that are guaranteed for the surveillance parameters of the engine, and not as a function of limit values, where said guaranteed values correspond to the values that can be reached by an old engine, so as to define the limiting margin of a surveillance parameter without running the risk of overestimation, and in particular without giving the pilot a false idea as to the amount of power margin that is genuinely available.

Furthermore, limiting margins may also be evaluated in terms of power margin, torque margin, or pitch margin, and may be supplied by a known first limitation instrument.

During step c), the limiting margins are thus transformed so as to obtain power margins. The power margin is thus equal, for example, to the limiting margin if previously determined in terms of power margin. Otherwise, it is necessary to perform a transformation using methods that are known and explained in the prior art so as to obtain, for example, a power margin derived from a limiting margin given in terms of pitch.

Finally, the first and second power margins are compared and the engine having the greater margin is accelerated. This enables the power of both engines to be balanced, with the engines ending up with power margins that are very close to each other, or even identical.

Furthermore, when a surveillance parameter is the speed of rotation of a gas generator of a said engine, then during step d), a first secondary difference is monitored between a first speed of rotation of the gas generator of the first engine and a second speed of rotation of the gas generator of the second engine so as to prevent the first secondary difference from exceeding a first predetermined threshold.

It is possible to envisage triggering an alarm when the first secondary difference exceeds said predetermined threshold, e.g. for the purpose of avoiding too great a difference in power between the two engines. Consequently, the acceleration needs to be carried out without triggering such an alarm.

Similarly, when a surveillance parameter is the torque from said engines, then during step d), a second secondary difference is monitored between a first torque from the first engine and a second torque from the second engine in order to prevent said second secondary difference exceeding a second predetermined threshold. The second predetermined threshold then advantageously corresponds to 30% of the limit torque that is acceptable by the main gearbox.

In order to implement the above method, the present invention also provides a system for metering the supply of fuel to first and second turboshaft engines in an aircraft so that these first and second engines are balanced in terms of power. The system has sensors for acquiring the current values of a plurality of engine surveillance parameters and also at least one regulation means for activating the fuel metering unit of the first and second engines.

The system of the invention is remarkable in that it is provided with main processor means that determine an individual margin for each surveillance parameter of each engine, and then first and second limiting margins respectively for the first and second engines, these first and second limiting margins being equal to the individual margins of the surveillance parameters respectively of the first and second engines that are closest to their limits. Thus, the first limiting margin represents the smallest individual margin amongst the surveillance parameters of the first engine, with the second limiting margin being likewise the smallest individual margin amongst the surveillance parameters of the second engine.

Furthermore, the system is also provided with at least one control means activating the regulation means so as to balance the power delivered by each of said engines by accelerating the engine having the greater limiting margin.

In a first embodiment, a control means and a main processor means are integrated in a single controlling electronic computer, e.g. a FADEC.

In a second embodiment, a main processor means is integrated in a first limitation instrument, a conventional IPL, while a control means is integrated in a controlling electronic computer of the FADEC type, for example. The controlling electronic computer then interrogates the IPL in order to obtain the limiting margins for the engines, transforms these limiting margins into power margins, and accelerates the engine having the greater power margin so as balance the powers of the two engines.

In a variant, each engine possesses its own regulation means and its own controlling electronic computer, in particular for safety reasons. Under such circumstances, each controlling electronic computer includes control means for balancing power from the engines, the two control means naturally being suitable for exchanging information in order to perform said balancing.

Independently of the embodiment and the variant selected, the control means advantageously monitors a first secondary difference between a first speed of rotation of the gas generator of the first engine and a second speed of rotation of the gas generator of the second engine in order to prevent the first secondary difference exceeding a first predetermined threshold.

Similarly, the control means preferably monitors a second secondary difference between a first torque from the first engine and a second torque from the second engine in order to prevent said second secondary difference exceeding a second predetermined threshold.

BRIEF DESCRIPTION OF THE DRAWING

The invention and its advantages appear in greater detail in the context of the following description which shows preferred embodiments given without any limiting character, and with reference to the accompanying figures, in which.

Elements shown in two or more distinct figures are given the same references in all of them.

MORE DETAILED DESCRIPTION

The present invention relates to a method and to a system for balancing power between first and second turboshaft engines M1 and M2 of an aircraft, e.g. a twin-engine rotorcraft.

Each engine M1, M2 is fitted with a fuel metering unit D that can be used for controlling its acceleration and its deceleration. In addition, the first and second engines M1 and M2 are provided with sensors 1, 2 suitable for measuring the values of their surveillance parameters, namely: the speeds of rotation Ng of their gas generators, their torque Cm, and the temperatures T45 at the inlet to their free turbines.

Figure 1:
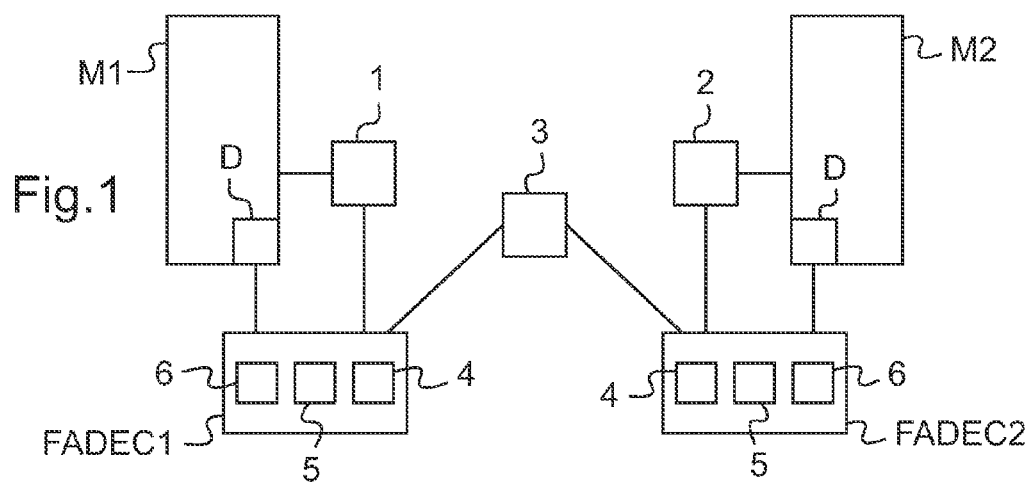
FIG. 1 is a block diagram of a system in accordance with a first embodiment.
Figure 2:
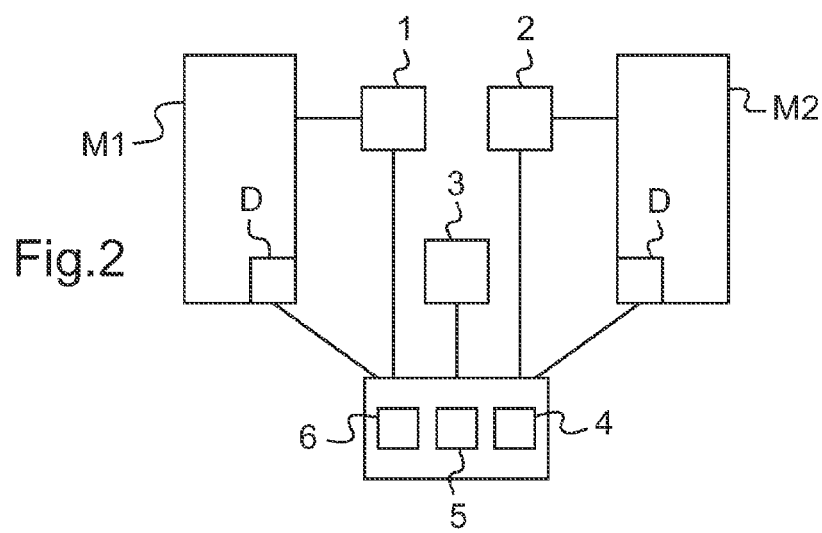
FIG. 2 shows a variant of the first embodiment of the invention.

FIGS. 1 and 2 show variants of a first embodiment of the invention.

With reference to FIG. 1, each engine M1, M2 includes a respective controlling electronic computer FADEC1, FADEC2 respectively controlling the fuel metering unit D of the engine M1, M2 to which it is connected, via regulation means 6.

Each controlling electronic computer is thus provided with regulation means 6, with control means 5 for accelerating or decelerating the engine, and in the first embodiment, with processor means 4.

Furthermore, the sensors 1, 2 transmit information respectively to the controlling electronic computers FADEC1, FADEC2 relating to first and second speeds of rotation NTL1 and NTL2 of the free turbines of the first and second engines M1, M2, which speeds are proportional to the substantially constant speed of rotation of the rotor of the rotorcraft that provides lift and propulsion.

Furthermore, a first setpoint, corresponding to the value that the first and second speeds of rotation NTL1 and NTL2 of the free turbines ought to have in order to ensure that the speed of rotation of the rotor is ideal, is itself determined in a first regulation loop.

As a result, if the first or second speeds of rotation NTL1 and NTL2 differ from said first setpoint, the regulation means 6 of the controlling electronic computers FADEC1, FADEC2 accelerate or decelerate respectively the engines M1, M2 in order to obtain the ideal speed of rotation for the rotor.

Under such conditions, in a first regulation loop, the regulation means 6 of each computer FADEC1, FADEC2 determine a second setpoint. This second setpoint corresponds to the value that ought to be reached respectively by the control parameters of the first and second engines M1, M2 in order to ensure that the first and second speeds of rotation NTL1 and NTL2 are equal to the first setpoint.

The regulation means 6 then use information delivered by the sensors 1, 2 and possibly also by a sensor 3 delivering the outside pressure P0 and temperature T0, in order to determine the rate at which fuel should be delivered to the engine. An increase or a decrease in the rate of delivering fuel will be stopped in the event of the control parameters for the engines reaching the second setpoint.

Furthermore, during the second regulation loop, power between the first and second engines M1 and M2 is balanced.

During a step a), the processor means 4 of the controlling electronic computers FADEC1 and FADEC2 act in real time to determine an individual margin for each surveillance parameter Ng, Cm, T45 of the first and second engines M1 and M2 respectively, these individual margins for the surveillance parameters being representative of the margin available for each of said surveillance parameters. For example, the individual margin corresponds to the individual difference in real time between a current value minus a limit value for each surveillance parameter, said limit value in turn depending on the outside pressure P0 and the outside temperature T0 as measured by the sensor 3.

Thereafter, the processor means 4 of the controlling electronic computers FADEC1, FADEC2 determine first and second limiting margins respectively for the first and second engines M1 and M2, these first and second limiting margins being respectively equal to the individual margin of said surveillance parameter for the first or the second engine M1 or M2 that is the closer to its limit. Thus, the first limiting margin represents the smallest individual margin of the surveillance parameters for the first engine M1, while the second limiting margin is likewise the smallest individual margin of the surveillance parameters of the second engine M2. For example, the first limiting margin corresponds to the individual margin for the speed of rotation Ng of the gas generator of the first engine M1, and the second limiting margin corresponds to the individual temperature margin T45 for the gas in the second engine M2. These individual margins may also be expressed in terms of power margin, torque margin, or indeed pitch margin.

Thereafter, during step c), the control means 5 transform the first and second limiting margins into first and second power margins, reducing these first and second limiting margins to a scale that is comparable to the power developed by said engines. The first and second limiting margins are thus expressed in terms of power margin. The move to step c) can then be instantaneous if, during step b) the limiting margins are already expressed in terms of power margin.

In step d) of the method, the control means 4 compare the values of the first and second power margins in order to determine which engine has the greater power margin and which engine has the smaller power margin.

Finally, in step e), the processor means 4 of the engine having the greater power margin instruct the corresponding regulation means 6 to actuate the metering unit D of the engine to accelerate that engine, thereby balancing the power from the engines MA1 and M2.

Similarly, in order to avoid changing the speed of rotation of the rotorcraft rotor, the processor means 5 of the engine having the smaller power margin instruct the corresponding regulation means 6 to actuate the metering means D of that engine to decelerate the engine.

Finally, the total power delivered by the first and second engines M1 and M2 is maintained, but the engines now have respective identical power margins. They are thus properly balanced, thus presenting multiple advantages, e.g. equivalent levels of damage, and power optimization of the engines M1 and M2.

With reference to FIG. 2, in a variant of the first embodiment, the system has only one controlling electronic computer, which controls both the first engine M1 and the second engine M2, being provided with processor means 4, control means 5, and regulation means 6. This variant reduces the amount of equipment required.

Figure 3:
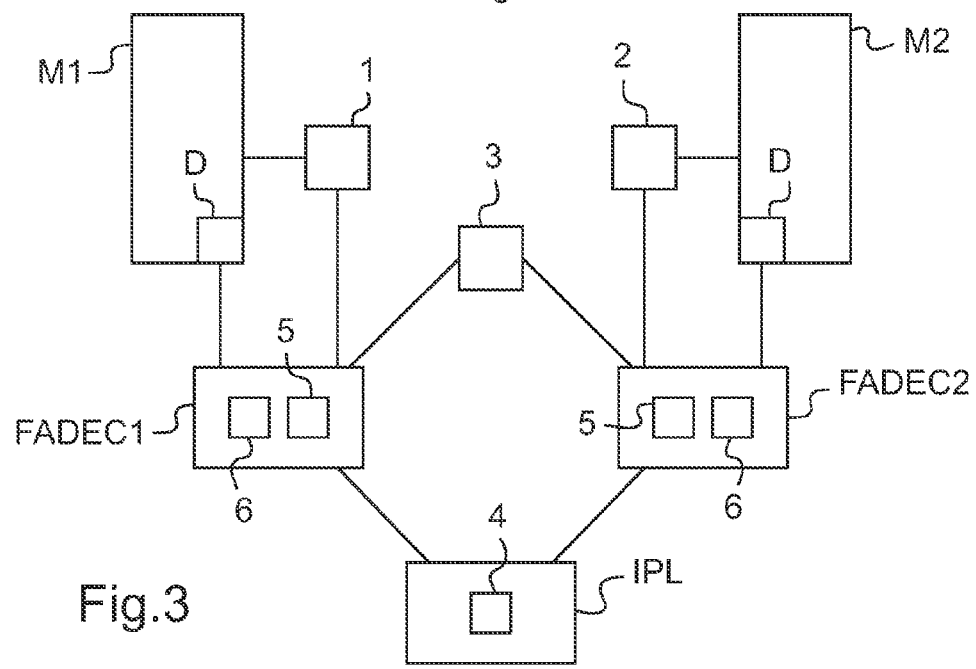
FIG. 3 is a diagram of a system in accordance with a second embodiment of the invention.

FIG. 3 shows a second embodiment of the invention.

Each engine M1, M2 is fitted with a respective controlling electronic computer FADEC1, FADEC2 provided with regulation means 6 and with control means 5.

Nevertheless, unlike the first embodiment, these controlling electronic computers FADEC1, FADEC2 do not have said processor means.

The system is provided with a first limitation instrument of the kind described in the prior art, with this first limitation instrument then being provided with said processor means for determining the limiting margins of the first and second engines and for delivering this information to the control means 5 of the controlling electronic computers FADEC1, FADEC2. FADEC1 and FADEC2 can then implement steps c), d), and e) of the method via their control means 5.

As above, a variant of the second embodiment (not shown in the figure) consists in using only one controlling electronic computer for both engines.

Independently of the embodiment or of the variant selected, the control means 5 advantageously monitor a first secondary difference between a first speed of rotation of the gas generator of the first engine M1 and a second speed of rotation of the gas generator of the second engine M2 in order to ensure that the first secondary difference does not exceed a first predetermined threshold.

In order to detect any excessive power difference between the two engines, it is possible to envisage monitoring said first secondary difference. If this first difference exceeds said first predetermined threshold, it can then be assumed that one of the engines is not operating properly. Consequently, the control means 5 ensures that this first secondary difference is not exceeded in order to avoid inducing the pilot in error.

Similarly, the control means 5 preferably monitors a second secondary difference between a first torque from the first engine M1 and a second torque from the second engine M2 in order to prevent this second secondary difference exceeding a second predetermined threshold.

Naturally, the present invention is capable of numerous variations concerning its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of balancing the power delivered by first and second turboshaft engines, each engine having a plurality of surveillance parameters (Ng, Cm, T45) each of a different type, the surveillance parameter amongst the surveillance parameters of the first engine that is closest to its limit is of a first type and the surveillance parameter amongst the surveillance parameters of the second engine that is closest to its limit is of a second type different than the first type, the method comprising:

a) determining in real time an individual margin for each surveillance parameter (Ng, Cm, T45) of each engine, the individual margin available for the surveillance parameter (Ng, Cm, T45);

b1) selecting for the purpose of balancing power delivered by the engines based on a comparison with one another (i) the surveillance parameter amongst the surveillance parameters of the first engine that is the closest to its limit and (ii) the surveillance parameter amongst the surveillance parameters of the second engine that is the closest to its limit, wherein the selected surveillance parameters are of different types from one another as the selected surveillance parameter of the first engine is of the first type and the selected surveillance parameter of the second engine is of the second type different than the first type;

b2) determining a first limiting margin for the first engine, the first limiting margin being equal to the individual margin of the selected surveillance parameter of the first engine, and determining a second limiting margin for the second engine, the second limiting margin being equal to the individual margin of the selected surveillance parameter of the second engine;

c) transforming the first and second limiting margins into first and second power margins, reducing the first and second limiting margins to a scale comparable to the power developed by the engines;

d) comparing the values of the first and second power margins whereby the selected surveillance parameters of the engines are compared with one another and then determining a primary difference between the first and second power margins; and e) at least one of (i) accelerating the engine having the greater power margin and (ii) decelerating the engine having the smaller power margin in order to bring the first and second engines into power balance, minimizing the primary difference between the first and second power margins to as great an extent as possible;

wherein for a surveillance parameter being the speed of rotation (Ng) of a gas generator of each of the engines, during step d), a first secondary difference is monitored between a first speed of rotation of the gas generator of the first engine and a second speed of rotation of the gas generator of the second engine in order to ensure that the first secondary difference does not exceed a first predetermined threshold.

2. The method according to claim 1, wherein each individual margin of a surveillance parameter (Ng, Cm, T45) is equal to the individual difference in real time between a current value minus a limit value for the surveillance parameter (Ng, Cm, T45).

3. The method according to claim 2, wherein the limit value of a surveillance parameter (Ng, Cm, T45) is established while taking account in real time of the outside pressure (P0) and of the outside temperature (T0).

4. A system for metering the supply of fuel to first and second turboshaft engines of an aircraft so that the first and second engines are balanced in power, each engine having a plurality of surveillance parameters (Ng, Cm, T45) each of a different type, the surveillance parameter amongst the surveillance parameters of the first engine that is closest to its limit is of a first type and the surveillance parameter amongst the surveillance parameters of the second engine that is closest to its limit is of a second type different than the first type, the system comprising:
   sensors for acquiring the current values of the surveillance parameters (Ng, Cm, T45) of the engines;
   regulation means for activating a fuel metering unit of each of the first and second engines;
   processor means that determine an individual margin for each surveillance parameter (Ng, Cm, T45) of each engine, select for the purpose of balancing power delivered by the engines based on a comparison with one another (i) the surveillance parameter amongst the surveillance parameters of the first engine that is the closest to its limit and (ii) the surveillance parameter amongst the surveillance parameters of the second engine that is the closest to its limit, wherein the selected surveillance parameters are of different types from one another as the selected surveillance parameter of the first engine is of the first type and the selected surveillance parameter of the second engine is of the second type different than the first type, and then determine first and second limiting margins respectively for the first and second engines, the first and second limiting margins being equal to the individual margin of the selected surveillance parameter respectively of the first and second engines;
   control means that transform the first and second limiting margins into first and second power margins, reducing the first and second limiting margins to a scale comparable to the power developed by the engines; and
   the control means activating the regulation means in order to balance the power delivered by the engines by at least one of (i) accelerating the engine having the greater power margin and (ii) decelerating the engine having the smaller power margin;
   wherein the control means monitor a first secondary difference between a first speed of rotation of a gas generator of the first engine and a second speed of rotation of a gas generator of the second engine in order to prevent the first secondary difference exceeding a first predetermined threshold.

5. The system according to claim 4, wherein the control means monitor a second secondary difference between a first torque from the first engine and a second torque from the second engine in order to prevent the second secondary difference exceeding a second predetermined threshold.

6. The system according to claim 4, wherein the control means and the processor means are integrated in a controlling electronic computer.

7. The system according to claim 6, wherein for each engine being controlled by a respective controlling electronic computer, each controlling electronic computer includes control means and regulation means for controlling the fuel metering unit of the engine to which it is connected.

8. The system according to claim 4, wherein the processor means is integrated in a first limitation instrument and the control means is integrated in a controlling electronic computer.

9. A method of balancing power delivered by first and second turboshaft engines, each engine having a plurality of surveillance parameters each of a different type, the method comprising:
   determining an individual margin for each surveillance parameter of each engine;
   selecting for comparison with one another (i) the surveillance parameter amongst the surveillance parameters of the first engine that is the closest to its limit and (ii) the surveillance parameter amongst the surveillance parameters of the second engine that is the closest to its limit;
   determining a first limiting margin for the first engine, the first limiting margin being the individual margin of the selected surveillance parameter of the first engine, and determining a second limiting margin for the second engine, the second limiting margin being the individual margin of the selected surveillance parameter of the second engine;
   transforming the first and second limiting margins into first and second power margins, reducing the first and second limiting margins to a scale comparable to the power developed by the engines;
   monitoring a secondary difference between the surveillance parameter of one type of the first engine and the surveillance parameter of the same type of the second engine; and
   while the secondary difference does not exceed a predetermined threshold, at least one of (i) accelerating the engine having the greater power margin and (ii) decelerating the engine having the smaller power margin, whereby the selected surveillance parameters of the engines are compared with one another, in order to bring the first and second engines into power balance;
   wherein the surveillance parameter of one type of the first engine is a speed of rotation (Ng) of a gas generator of the first engine and the surveillance parameter of the same type of the second engine is a speed of rotation (Ng) of a gas generator of the second engine.

10. The method according to claim 9, wherein the surveillance parameter amongst the surveillance parameters of the first engine that is closest to its limit is of a first type and the surveillance parameter amongst the surveillance parameters of the second engine that is closest to its limit is of a second type different than the first type.

* * * * *